July 2, 1935.  H. T. HUNTER  2,006,832
COOKING APPARATUS
Filed May 11, 1931  3 Sheets-Sheet 1
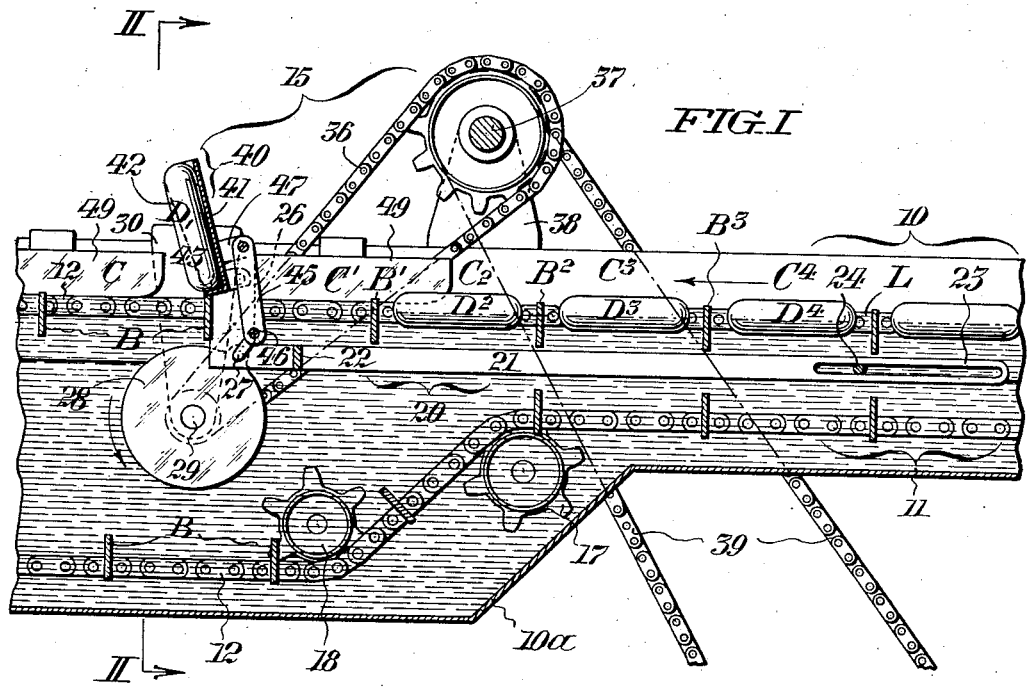
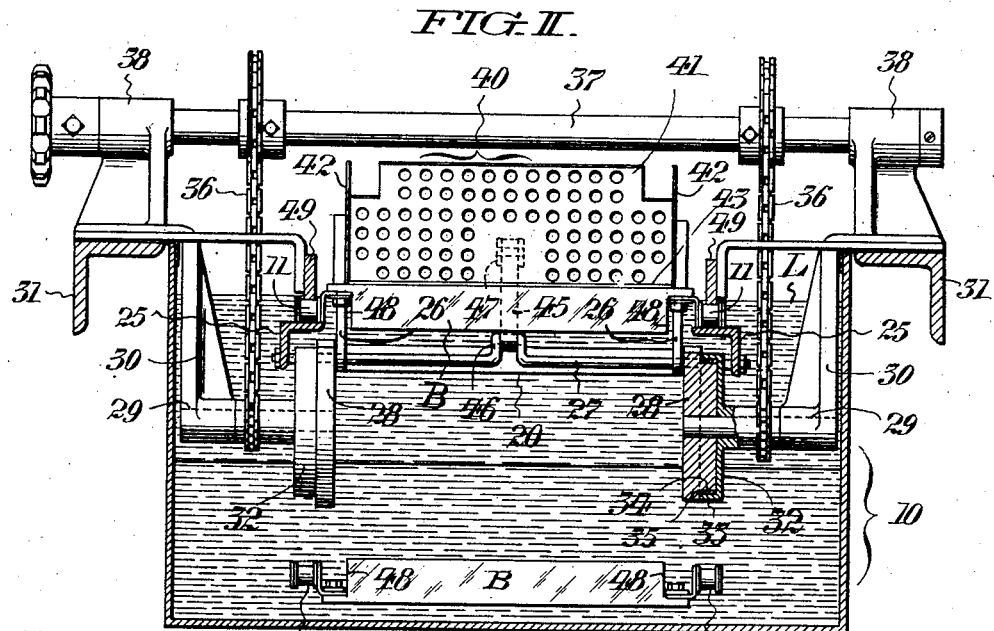
WITNESSES
John C. Boynes
Hubert Fuchs
INVENTOR:
Herbert T. Hunter,
BY Fraley Paul
ATTORNEYS.

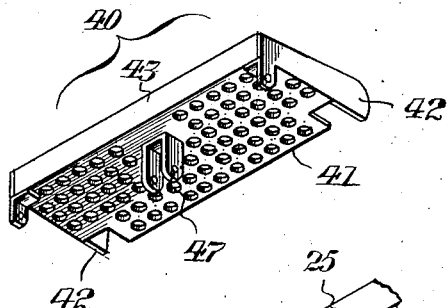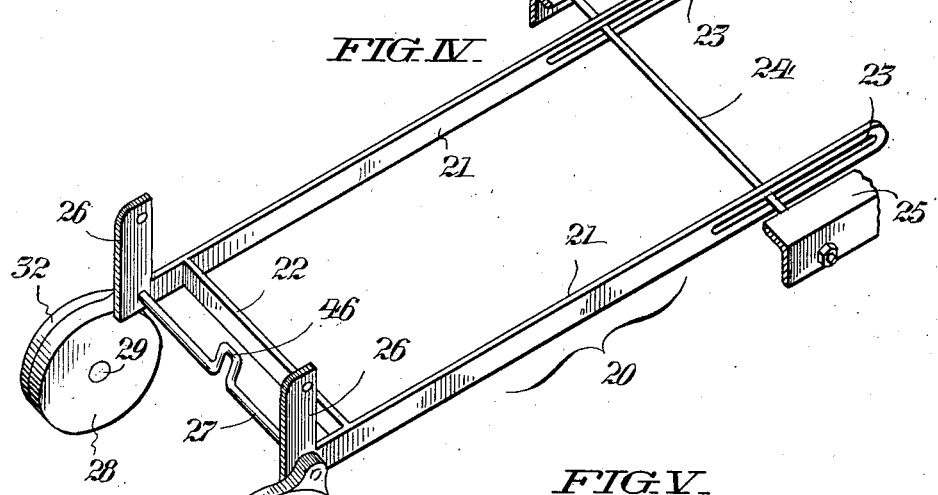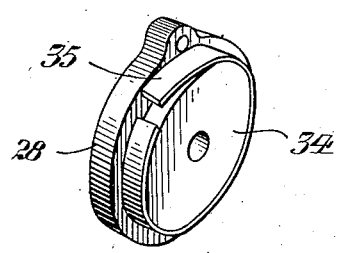

July 2, 1935.　　　　H. T. HUNTER　　　　2,006,832
COOKING APPARATUS
Filed May 11, 1931　　　　3 Sheets-Sheet 3
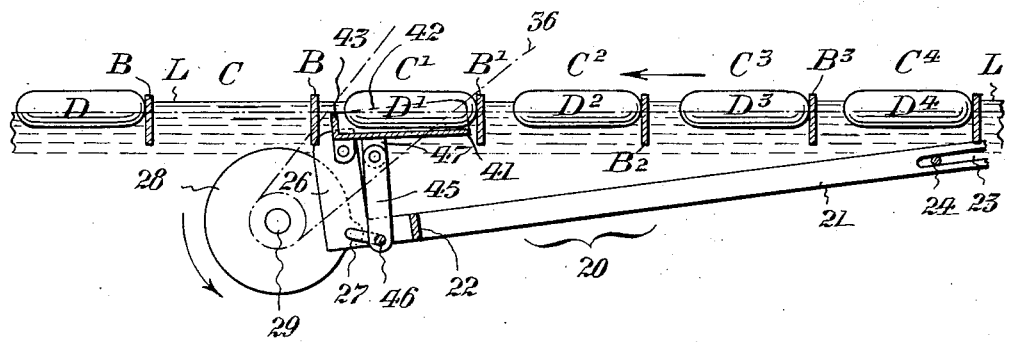
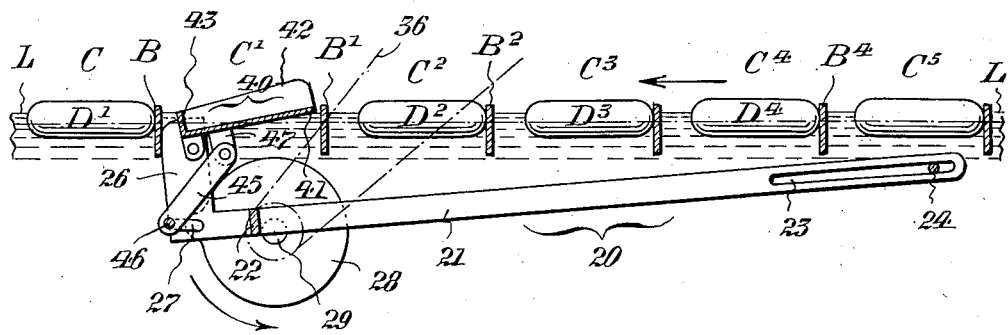
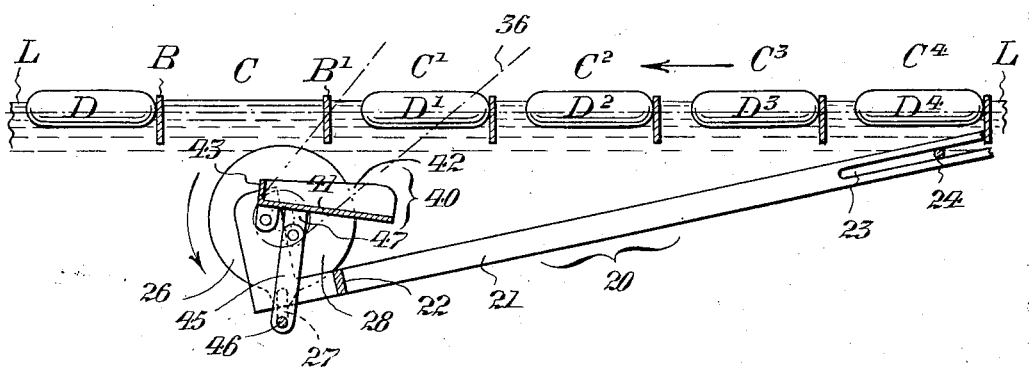
INVENTOR:
Herbert T. Hunter,
BY
ATTORNEYS.

Patented July 2, 1935

2,006,832

UNITED STATES PATENT OFFICE 2,006,832

COOKING APPARATUS

Herbert T. Hunter, Baltimore, Md., assignor to Doughnut Machine Corporation, New York, N. Y., a corporation of New York Application May 11, 1931, Serial No. 536,519

7 Claims. (Cl. 53—7)

My invention relates to cooking apparatus in which hot liquor is employed as the cooking medium.

More particularly, my invention is concerned with cooking apparatus of the type exemplified in a co-pending application, Serial No. 370,559, filed by me on June 13, 1929, for producing doughnuts and the like, which matured as U. S. Patent No. 1,823,146, dated September 15, 1931. In the apparatus of the patent supra, the doughnuts are maintained in definite separation incident to progression afloat in an elongated receptacle containing the hot cooking liquor, by a pair of serially arranged cellular conveyors, and after having traversed about half the length of the receptacle, the doughnuts are turned over and at the same time transferred successively from the cells of one conveyor to the cells of the other conveyor by mechanism operating intermittently in an interval between the two conveyors.

The main objects of my present invention are to dispense with the necessity for subdividing the conveying means as was the case in the apparatus of the patent referred to above; and to provide a simpler form of manipulating mechanism which is continuous in its operation and subject to the direct control of the conveying means without the aid of intermediary timing connections, and which is moreover capable of temporarily traveling along with the said conveying means as it performs the function of successively turning the doughnuts over incident to transferring them from one conveyor cell to another.

Other objects and attendant advantages of this invention will be manifest from the detailed description following of the accompanying drawings, wherein; Fig. I is a fragmentary longitudinal sectional view of a doughnut cooking apparatus conveniently embodying the present improvements.

Fig. II is a cross section of the apparatus taken as indicated by the arrows II—II in Fig. I.

Figs. III, IV and V are perspective views of certain of the parts of the doughnut manipulating mechanism of the apparatus; and, Figs. VI, VII and VIII are diagrammatic longitudinal sectional views, corresponding generally to Fig. I, showing the conveying means and the manipulating means in successive positions during the turning and transferring of a doughnut.

As delineated in Figs. I and II of these illustrations, my improved cooking apparatus comprises an elongate receptacle 10 in which the hot cooking liquor is maintained at the constant level indicated at L. The raw doughnuts D, $D^1$, $D^2$, etc. are introduced into the right hand end (as considered in Fig. I) of the receptacle 10, and progressed lengthwise of the latter afloat in the cooking liquor, by a unitary conveyor 11 consisting of a pair of endless sprocket chains 12 and a series of uniformly spaced cross bars B, $B^1$, $B^2$, etc., that set apart individual cells C, $C^1$, $C^2$, etc., for maintenance of the doughnuts D in definite separation. It is to be assumed that the conveyor 11 is continuously operated by suitable drive mechanism not shown, at a relatively slow uniform rate of speed so that the doughnuts D are fully cooked by the time they reach the opposite end of the receptacle after having floated first on one side and then on the other in the liquor.

The function of turning over the doughnuts D and at the same time transferring them successively between adjacent cells of the conveyor is vested in the manipulating mechanism comprehensively designated by the numeral 15. This manipulating mechanism is located substantially midway of the length of the cooking receptacle 10 and operates for the most part submerged in a depression or pocket 10a of the said receptacle. As shown in Fig. I, the lower run of the conveyor 11 is diverted downward into the depression or pocket 10a by directional sprocket pinions 17 and 18 so as to be entirely clear of the manipulating mechanism. Forming a part of the manipulating mechanism is a horizontal frame-like element 20 comprising two spaced parallel longitudinal side bars 21 which are joined at one end by a transverse member 22. At their opposite ends, the longitudinals 21 of the element 20 are slotted as at 23 for sliding guidance by a rod 24 which extends crosswise between a pair of conveyor chain supporting rails 25 within the receptacle 10. Upstanding projections 26 at the forward end of the element 20 are pierced near their bottoms for pivotal engagement with a crank rod 27 joining a pair of disk heads 28, see Figs. II and IV, the ends of the said crank rod being rigidly secured against the possibility of rotation in the disk heads. From Fig. II it will be noted that the disk heads 28 are respectively connected to a pair of axially-aligned transversely-arranged shafts 29 having submerged journal support in separate bearing brackets 30 which reach down from frame angles 31 extending along opposite sides of the top receptacle 10 at the exterior. The shafts 29 are yieldingly driven in the direction indicated by the arrows in Figs. I, VII and VIII by means of clutch devices, each of which comprises a hollow disk 32 with a peripheral flange 33 to circumferentially lap a diametrically reduced shoulder portion 34 of the corresponding disk head 28 and to frictionally engage with a volute leaf spring 35 fastened at one end to the said head, see Figs. II and V. As shown, the drive disks 32 are free on the shafts 29 and coordinated for rotation in unison by separate sprocket chains 36 with a jack shaft 37 which bridges the receptacle 10, and which, as shown in Figs. I and II, is journalled in bearings 38 upstanding from the frame angles 31 previously referred to. For a reason later on explained, the jack shaft 37 is rotated at a very much higher speed than the conveyor 11, through a sprocket chain connection 39 with the drive mechanism (not shown) of the apparatus. Disposed between the upward projections 26 of the frame-like element 20 and pivoted to the upper ends is a hand or transfer device 40. This hand or transfer device 40 is in the present instance made from sheet metal with a perforated doughnut engaging surface 41 and upward guards 42 at its opposite sides, see Fig. III. A perpendicular flange or projection 43 at the forward end of the surface 41 of the hand 40 operates as a heel to support the doughnuts on edge as they are being turned and transferred, see Fig. I. A link 45 having loose pivotal connections between a short eccentric offset 46 of the crank rod 27 and a pivot lug 47 depending centrally from the hand 40 somewhat beyond its pivot axis, is instrumental in swinging the said hand up and down during each operation of the manipulating mechanism in a manner to be presently described.

The operation of my improved apparatus is as follows: By virtue of its slotted connections 23 at one end with the fixed guide rod 24 and its pivotal connection at the forward end to the crank rod 27 joining the two rotating disk heads 28, the frame-like element 20 is reciprocated back and forth horizontally within the receptacle 10. As a consequence of being carried by the rotating end of the frame-like element 20, the hand 40 is caused to trace a circular path for capacity to move up and down in each cell of the conveyor 11 and to travel along temporarily with the conveyor 11 as a doughnut is transferred inverted to the cell ahead in the direction of progression. In performing the turning and transferring cycle, the parts of the manipulating mechanism 15 assume the successive positions illustrated respectively in Figs. VIII, VI, I and VII. Thus in Fig. VIII the doughnut engaging hand 40 is substantially horizontal and about to enter the cell C' of the conveyor 11 from beneath. The rotation of the shafts 29 is at this time rapid and continues so until the upward projections 26 of the frame-like element 20 encounter the vane B of the conveyor as in Fig. VI. Thereafter, the frame-like element 20 is restrained by the conveyor 11 and obliged to travel slowly forwardly with it, this being made possible through concurrent slippage between the friction springs 35 on the disk heads 28 and the driving disks 32. As the hand 40 continues to move upward in the cell C' of the conveyor 11, it lifts the doughnut D' within that cell as in Fig. VI, and is finally swung upward on its pivot axis to the position shown in Fig. I through the thrust communicated to the coupling link 45 by the action of the eccentric offset 46 in the crank rod 27. The doughnut D' is thereby turned on the heel 43 of the hand 40 and at the same time transferred over the cross bar B of the conveyor into the cell C directly ahead in the direction of progression. During continued progression of the conveyor 11 and attendant forward passage of its cross bar B over the axes of the disk heads 28, the hand 40 is swung back on its pivot connection with the frame-like element 20 by reverse action of the eccentric offset 46 in the crank rod 27 and concurrently caused to recede downwardly in the conveyor cell C', as shown in Fig. VII, the upward projections 26 of the frame-like element remaining all the while in contact with the said bar B. Eventually upon disengagement of the projections 26 of the element 20 from the cross bar B of the conveyor, the mechanism 15 is immediately driven at full speed with the result that the hand 40 is quickly swung into the next succeeding conveyor cell C² in readiness to turn the doughnut D² in that cell, in exactly the same manner as described with regard to the turning of the doughnut D'. In this connection it is important to note that the conveyor cross bars B, B', etc. are cut away at the ends as at 48 in Fig. II to clear the longitudinals 21 of the frame-like element 20 when in its lowermost position as viewed in Fig. VIII, and as will be appreciated on an examination of Fig. I; also that fixed skids 49 are provided along the opposite sides of the cooking receptacle 10 to prevent lifting of the upper run of the conveyor 11 while the hand 40 is being thrust upward through the conveyor cells.

From the foregoing it will be evident that the manipulating means is positive in its action, and, as a consequence of being controlled directly by the conveyor, it cannot possibly become untimed with relation to the operation of the latter. The manipulating mechanism is further unique in that it does not require any adjustment whatsoever, it being therefore reliable in its action and entirely free from the possibility of derangement over long periods of continued use.

I do not wish to be limited to the precise details of construction and arrangement specifically set forth herein, since these are subject to considerable variation in practice without departing from the spirit of my invention as defined in the appended claims.

Having thus described my invention, I claim:

1. In apparatus for cooking doughnuts and the like, a conveying means with cross bars setting apart a series of cells to maintain the doughnuts in definite separation incident to progression afloat in hot cooking liquor; and manipulating mechanism including a hand, a pivoted support for the hand, means determining a circular path for the pivotal support, thereby to carry the hand up and down successively through the cells of the conveying means and at the same time cause it to travel along horizontally with the conveying means temporarily; and means for swinging the hand on its pivot incident to upward movement in each cell of the conveying means to transfer the doughnut from such cell to an adjacent cell over the intervening subdividing bar.

2. In apparatus for cooking doughnuts and the like, a slowly moving conveying means with cells to maintain the doughnuts in definite separation incident to progression afloat in hot cooking liquor; and manipulating mechanism including a pivoted hand, a pivoted support for the hand, rotary means confining the pivotal support to a circular path to carry the hand up and down through the cells of the conveying means successively and at the same time cause it to travel horizontally along with the conveying means temporarily; means for swinging the hand on its pivot incident to upward movement in each cell of the conveying means to transfer the doughnut from such cell to a cell ahead in the direction of travel, and means for yieldingly driving the rotary means aforesaid to effect, after each turning operation, rapid transition of the hand from the empty conveyor cell to a succeeding cell in readiness to repeat the transfer operation but permit the hand to take the slower speed of the conveyor incident to travelling with the latter as aforesaid.

3. In apparatus for cooking doughnuts and the like, a slowly moving conveying means with cells to maintain the doughnuts in definite separation incident to progression afloat in hot cooking liquor; and manipulating mechanism including a hand, a pivotal support for the hand, a rotary means confining the pivotal support to a circular path to carry the hand up and down through the cells of the conveying means successively and at the same time cause it to travel horizontally with the conveying means temporarily; means for swinging the hand on its pivot incident to upward movement in each cell of the conveying means to transfer the doughnut from such cell to a cell ahead in the direction of progression, and friction means for driving the rotary means aforesaid to effect, after each transfer operation, rapid transition of the hand from the empty cell of the conveying means to a succeeding cell in readiness to repeat the transfer operation, but permitting the hand to take the slower speed of the conveying means during travel with the latter as aforesaid.

4. In apparatus for cooking doughnuts and the like, a conveyor with cells to maintain the doughnuts in definite separation incident to progression afloat in hot cooking liquor; and cooperating doughnut manipulating means including a horizontal element with guidance for reciprocation back and forth beneath the conveyor, a hand supported with capacity for swinging movement from a horizontal to a vertical position on one end of the element aforesaid, a rotating member affording a crank center to which the hand carrying end of the horizontal element is pivotally connected and whereby the hand is confined to a circular path for capacity to move up and down through the cells of the conveyor successively and at the same time to travel horizontally along with the conveyor temporarily, and means for swinging the hand incident to bodily movement upward in each conveyor cell to transfer the doughnut from such cell to an adjacent cell.

5. In apparatus for cooking doughnuts and the like, a slowly moving conveyor with cells to maintain the doughnuts in definite separation incident to progression afloat in hot cooking liquor; and cooperating doughnut manipulating means including a horizontal element with guidance for reciprocation back and forth beneath the conveyor, a hand supported with capacity for swinging movement from a horizontal to a vertical position on one end of the element aforesaid, a rotating member affording a crank center to which the hand carrying end of the horizontal element is pivotally connected and whereby the hand is confined to a circular path for capacity to move up and down through the cells of the conveyor successively and at the same time to travel horizontally along with the conveyor temporarily, means for swinging the hand incident to bodily movement upward in each conveyor cell of the conveying means to transfer the doughnut from such cell to the cell ahead in the direction of progression, and friction means for driving the rotating member aforesaid to effect, after each transfer operation, rapid transition of the hand from the empty conveyor cell to a succeeding cell in readiness to repeat the transfer operation, but permitting the hand to take the slower speed of the conveyor during travel with the latter as aforesaid.

6. In apparatus for cooking doughnuts and the like, a slowly moving conveyor with cells to maintain the doughnuts in definite separation incident to progression afloat in hot cooking liquor; and cooperating doughnut manipulating means including a horizontal element with guidance for reciprocation back and forth beneath the conveyor, a hand supported, with capacity for swinging movement from a horizontal to a vertical position, on one end of the element aforesaid, a rotating member affording a crank center to which the hand carrying end of the horizontal element is pivotally connected and whereby the hand is confined to a circular path for capacity to move up and down through the conveyor cells successively and at the same time to travel horizontally along with the conveyor temporarily, and a link connecting the hand to an eccentric offset of the crank center aforesaid, whereby, incident to bodily movement upward in each conveyor cell, the hand is swung to transfer the doughnut from such cell to an adjacent cell.

7. In apparatus for cooking articles, such as doughnuts and the like, conveyor means with cells to maintain the articles in definite separation while progressed afloat in hot cooking liquor, manipulator means in the form of a pivotally-mounted element whereby the articles are transferred inverted from one conveyor cell to the cell ahead in the direction of progression, and mechanism whereby the pivot axis of said element is reciprocated horizontally with concurrent tracing of a circular up-and-down path into and out of the conveyor cells, said element when in the cell being temporarily restrained by the conveyor and simultaneously swung vertically to effect the article transfer operation.

HERBERT T. HUNTER.